United States Patent [19]
Onorato et al.

[11] Patent Number: 4,776,867
[45] Date of Patent: Oct. 11, 1988

[54] PROCESS FOR MOLDING OPTICAL COMPONENTS OF SILICATE GLASS TO A NEAR NET SHAPE OPTICAL PRECISION

[75] Inventors: Paulette I. K. Onorato, Sudbury; Sophia R. Su, Weston, both of Mass.

[73] Assignee: GTE Laboratories Incorporated, Waltham, Mass.

[21] Appl. No.: 44,673

[22] Filed: May 1, 1987

Related U.S. Application Data

[62] Division of Ser. No. 896,780, Aug. 15, 1986, Pat. No. 4,680,049.

[51] Int. Cl.$^4$ .............................................. C03B 19/06
[52] U.S. Cl. ....................................... 65/18.1; 65/901; 423/338
[58] Field of Search ................. 65/901, 17, 18.1, 18.2; 501/12; 423/338

[56] References Cited

U.S. PATENT DOCUMENTS

| | | | |
|---|---|---|---|
| 2,441,422 | 5/1948 | Krieble | 65/901 |
| 2,974,105 | 3/1961 | Iler | 252/309 |
| 3,311,481 | 3/1967 | Sterry | 65/901 |
| 3,833,347 | 9/1974 | Angle et al. | 65/32 |
| 3,900,328 | 8/1975 | Parsons et al. | 106/39.5 |
| 4,028,085 | 6/1977 | Thomas | 65/901 |
| 4,059,658 | 11/1977 | Shoup et al. | 65/901 |
| 4,168,961 | 9/1979 | Blair | 65/66 |
| 4,246,139 | 1/1981 | Witt | 423/339 |
| 4,327,065 | 4/1982 | Dardel | 423/338 |
| 4,426,216 | 1/1984 | Satoh et al. | 65/18.1 |
| 4,432,956 | 2/1984 | Zarzycki et al. | 65/901 |
| 4,436,542 | 3/1984 | Kurosaki | 65/18.1 |
| 4,560,399 | 12/1985 | Luong | 65/18.1 |
| 4,562,018 | 12/1985 | Neefe | 264/2.7 |
| 4,574,063 | 3/1986 | Scherer | 65/901 |

OTHER PUBLICATIONS

Susa et al; Electronics Letters (Jun. 10, 1982) vol. 18, No. 12, pp. 499–500.
Sakka et al; Journal of Non-Crystalline Solids, 48 (1982) 31–46, North Holland Publishing Company.
Yamane et al; Journal of Non-Crystalline Solids (1984) vol. 63, No. 1–2, pp. 13–21.
Harmer et al; IFOC, Nov./Dec. 1982, pp. 40–41.

*Primary Examiner*—Kenneth M. Schor
*Attorney, Agent, or Firm*—Ivan L. Ericson

[57] ABSTRACT

A silicate optical glass article is made by forming a gel from a hydrolyzed silicon alkoxide. The resulting gel is molded, cured, dried, solvents removed, heated to form a dense glass having near net shape dimensions thereby reducing expensive polishing steps to obtain the desired final dimensions and surface quality.

7 Claims, 2 Drawing Sheets

MEAN DEVIATION
OVER 3mm = 10.5 μm
($\sigma$ = 2.9 μm)

MEAN DEVIATION
OVER 3mm = 12.0 μm
($\sigma$ = 3.2 μm)

PROCESS FOR MOLDING OPTICAL COMPONENTS OF SILICATE GLASS TO A NEAR NET SHAPE OPTICAL PRECISION

This is a divisional of copending application Ser. No. 896,780 filed on Aug. 15, 1986 now U.S. Pat. No. 4,680,049.

FIELD OF THE INVENTION

This invention relates to a method of making optical glass components.

More particularly, this invention relates to a method for making silicate optical glass components.

BACKGROUND OF THE INVENTION

Expanded beam lense inserts used in optical fiber connectors are currently made of an acrylic plastic rather than glass. A glass lense has many advantages over plastic lenses. Glass has an index of refraction closely matching that of optical fibers, resulting in lower reflection losses; it transmits in the wavelength range of 1.1–1.5 microns where plastic absorbs; it is more stable under extreme temperature conditions; durable antireflection coatings can be applied to glass; and the thermal expansion of glass is lower than that of plastic and matches that of the optical fiber, thereby maintaining the integrity of the fiber alignment.

A sol-gel process has been used to make monoliths of optical quality glass as related in U.S. Pat. No. 4,426,216 Satoh et al., Process for Producing Optical Glass; U.S. Pat. No. 4,323,381 Matsuyama et al., Method for Producing Mother preforms Rods for Optical Fibers; and Harmer et al., "The Sol-Gel Method for Optical Fiber Production", *IFOC*, Nov/Dec (1982) 40–44. However, the dimensional tolerances of the monoliths have not been maintained because of the shrinkage of the gel during drying and/or sintering. Quality glasses have also been made using colloidal techniques, but these glasses require a higher sintering temperature than those made by the process described by an instant invention. This is because colloid-derived glasses have larger pore and particle sizes and the higher temperature processing and conditions increase the difficulty of maintaining dimensional tolerances. Another disadvantage of the colloidal technique is that in the multicomponent glasses there are compositional heterogeneities on the scale of the colloid.

SUMMARY OF THE INVENTION

In accordance with one aspect of the present invention, a new and improved method for making a silicate optical glass article comprises the following steps:

Step 1—Completely hydrolyze silicon alkoxide in a solvent to form a solution having a molar ratio of silicon alkoxide to water in the range of about 1 to about 10.

Step 2—Partially remove from about 20 to about 60 volume percent of solvent from the resulting solution of Step 2 to form a concentrate.

Step 3—Transfer the product in step 2 into a mold.

Step 4—Completely polymerize the product from step 3.

Step 5—Remove the remaining solvent from the product of step 4 to form a solid.

Step 6—Remove the solid from step 5 from the mold.

Step 7—Sinter the product from step 6 to a density greater than 99% of theoretical density at a temperature equal to or less than 1150° C. to form a near net shaped dense glass article having a near net shape deviation equal to or less than about 12 microns over 3 mm.

In accordance with another aspect of the present invention, a new and improved method for making a silicate optical glass article comprises the following steps:

Step 1—Completely hydrolyze silicon alkoxide in a solvent at a pH from about 2 to about 4 to form a solution having a molar ratio of silicon alkoxide to water in the range of about 1 to about 10.

Step 2—Partially remove from about 20 to about 60 volume percent of solvent from the resulting solution of Step 1 to form a concentrate.

Step 3—Add sufficient ammonium hydroxide to the concentrate of Step 2 to raise the pH of the concentrate from about 6.8 to about 8.0 to accelerate gelation.

Step 4—Transfer the product formed in Step 3 into a mold before complete gelation occurs.

Step 5—Cure the gel formed in the mold from Step 4 for a period of about 16 to about 48 hours and add a temperature from about 20° C. to about 60° C., without drying, to form a cured molded article.

Step 6—Remove the cured molded article from the mold.

Step 7—Displace remaining solvent from the product of Step 6 with a displacing solvent.

Step 8—Supercritically dry the product from Step 7 to form a dried gel.

Step 9—Flush the product from Step 8 with an inert gas sufficient to remove any trace of the displacing solvent.

Step 10—Sinter the product from Step 9 in a dry oxidizing atmosphere up to about 500° C. followed by sintering up to 1150° C. in oxygen for period sufficient to form a dense glass article having a near net shape deviation equal to or less than about 12 microns over 3 mm.

Figure 1:
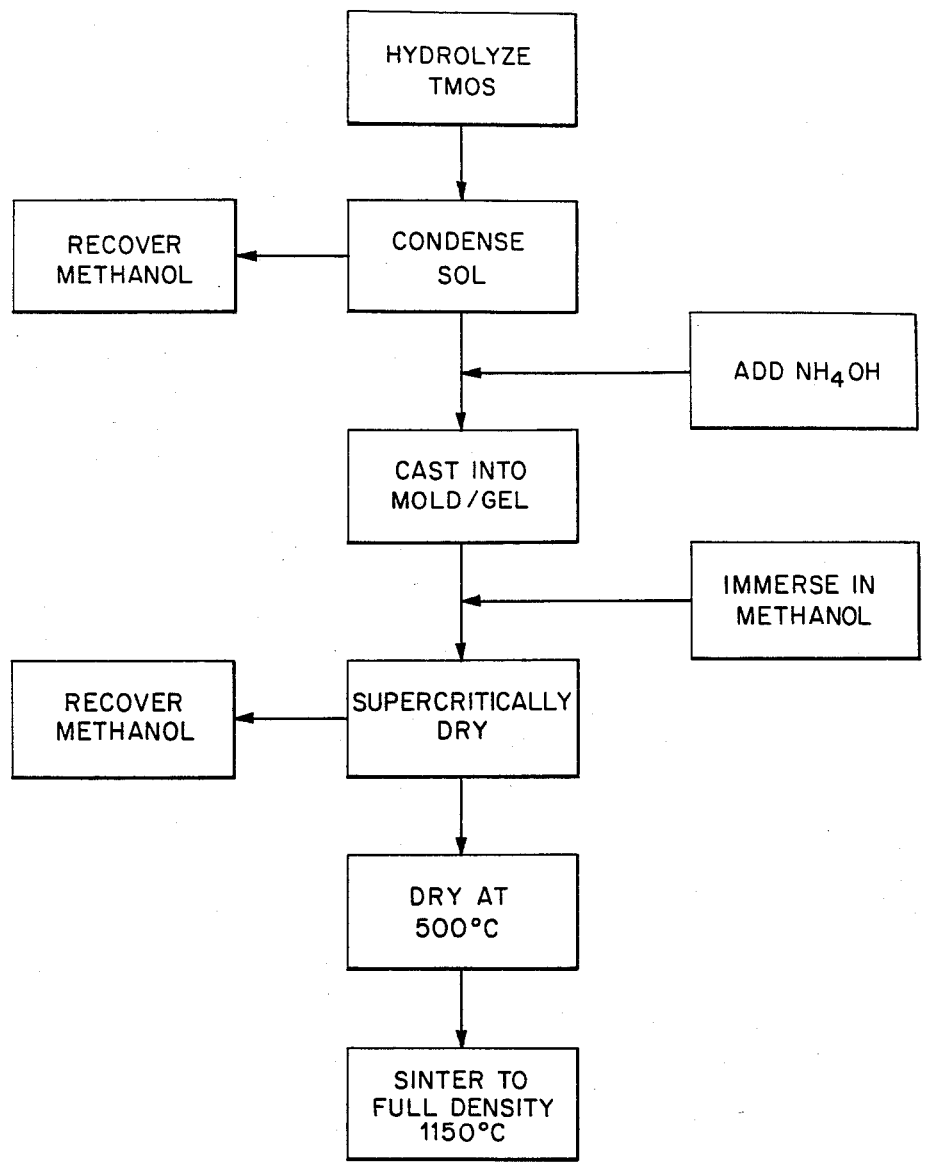
FIG. 1 is a schematic for the fabrication of $SiO_2$ optical glass components in accordance with the present invention.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

The process described herein overcomes the difficulties encountered by the prior art by compensating in the molding process for subsequent non-linear shrinkage, by minimizing shrinkage and distortion during drying.

After sintering the dimensions of optical components are very close to the required tolerances (within 5 microns over 4 millimeters) and the surface quality is comparable to that of the original mold.

The advantages of this invention are:
1. refractory $SiO_2$ glass can be prepared at low temperature,
2. this process leads to a product which is fabricated to a near-net shape optical precision.

Criteria for material selection for this invention are moldability, uniformity and minimizing of shrinkage for maintenance of optical precision. The materials included two silicon alkoxides: tetramethylorthosilicate (TMOS), $Si(OCH_3)_4$, and tetraethylorthosilicate (TEOS), $Si(OC_2H_5)_4$; and colloidal silica. $Si(OCH_3)_4$, (TMOS), was preferred because it has a high $SiO_2$ content (39.5 wt % vs. 28.8 wt % for TEOS) and chemical reactivity.

Reaction conditions including hydrolysis and polycondensation of hydrolyzed $Si(OH)_4$ were developed and processing parameters were optimized.

The hydrolysis and polymerization of $Si(OCH_3)_4$ are described schematically as:

$$n\ Si(OCH_3)_4 + 4n\ H_2O \longrightarrow n\ Si(OH)_4 + 4n\ CH_3OH \quad (1)$$

$$n\ Si(OH)_4 \longrightarrow n\ SiO_2 + 2n\ H_2O \quad (2)$$

The reactions which actually occur in the hydrolysis of a methanol solution of silicon methoxide, however, are considered to be more complicated.

The reactions occurring in the initial stage of sol-gel transition may be:

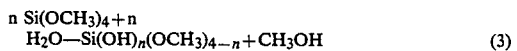

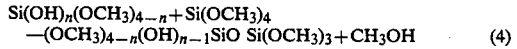

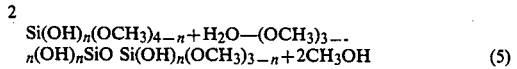

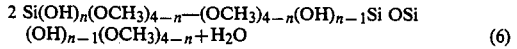

These reactions are very sensitive to the experimental conditions such as the presence of acidic or basic catalysts, the gelling temperature, the molar ratio of alkoxides to $H_2O$. Consequently, the properties of the gels obtained by the sol-gel transition of $Si(OCH_3)_4$ depends on several parameters. Two factors, pH and temperature, which affect the rate of hydrolysis were systematically studied on the system TMOS:$H_2O$:methanol=1:4:3. Results are tabulated in Tables I through IV. Gas chromatography (GC) HP5710A/Mass spectrometer HP5980A was used to monitor the hydrolysis rate of TMOS. Samples of 0.1 microliters were taken at various intervals and injected into a GC with a SP 1000 Carbopack B capillary column at a 200° C. isotherm. Helium was used as a carrier gas.

Data demonstrate that the hydrolysis of TMOS is the only reaction at ambient temperature and in an acidic environment (Table I). The rate is a function of $H_2O$ concentration as shown in Table IV. More than 6 hrs are required for the starting TMOS to be consumed at 1:2 molar ratio of TMOS to $H_2O$. Four hours are needed when the theoretical amount of $H_2O$ i.e. four moles is used. However, less than one hour is required when the molar ratio of $H_2O$: TMOS is 8:1. In addition, a molar ratio of $H_2O$:TMOS as high as 10:1 can be used. Furthermore, the rate of hydrolysis is accelerated by raising the reaction temperature as shown in Tables II and III. When the acid is used as a catalyst, i.e. pH=4.4, the reaction is complete in an hour at 75° C. as compared to 4 hrs at ambient. In the neutral condition, i.e. pH=6.5, 10 wt % of TMOS remained after 6 hrs reaction time at 50° C. as compared to 20 wt % of TMOS after 28 hrs at 25° C.

TABLE I
HYDROLYSIS RATE OF $Si(OCH_3)_4$ vs. pH AT AMBIENT TEMPERATURE

| pH | Catalyst | Reaction Time (hrs) | wt % Unreacted TMOS |
|---|---|---|---|
| 4.4 | dil. $HNO_3$ | 4 | None detectable |
| 6.5 | None | 28 | 20 |
| *8.0 | dil. $NH_4OH$ | 1½ | 65 |

*Sample gelled after 2 hrs reaction time.

TABLE II
HYDROLYSIS RATE OF $Si(OCH_3)_4$ vs. TEMPERATURE AT pH = 4.4

| Temperature °C. | wt % Unreacted TMOS After 1 hr | Time Required (hrs) for Complete Disappearance of TMOS |
|---|---|---|
| 25° | 70 | 4 |
| 50° | 10 | 1½ |
| 75° | None detectable | 1 |

TABLE III
HYDROLYSIS RATE OF $Si(OCH_3)_4$ vs. TEMPERATURE AT pH = 6.5

| Temperature °C. | Reaction Time (hrs) | wt % Unreacted TMOS |
|---|---|---|
| 25° | 28 | 20 |
| 50° | 6 | 10 |

TABLE IV
HYDROLYSIS RATE OF TMOS vs. MOLAR RATIO OF TMOS TO $H_2O$ AT AMBIENT TEMPERATURE AT pH = 4.4

| Molar Ratio of TMOS: $H_2O$: MeOH | Time Required (hrs) for Complete Disappearance of TMOS |
|---|---|
| 1:2:3 | 6 hrs |
| 1:4:3 | 4 hr |
| 1:8:3 | 1 hr |

TABLE V
*EFFECT OF pH ON RATE OF GELATION AT AMBIENT TEMPERATURE

| pH | Gelation Time | Quality of Gel |
|---|---|---|
| 4.4 | 24 hr | Clear |
| 6.5 | 20 minutes | Clear to Opaque |
| 8.0 | 5 minutes | Opaque |

*TMOS was hydrolyzed at pH 4.4.

TABLE VI
EFFECT OF TEMPERATURE UPON RATE OF GELATION AT pH = 4.4

| Temperature °C. | Gelation Time (hrs) |
|---|---|
| 25° | 24 |
| 50° | 4½ |
| 75° | ¾ |

The rate of hydrolysis of tetramethylorthosilicate (TMOS) was also monitored by gas chromatography. The amount of TMOS (retention time $(t_R)=1.4$ min) decreases with reaction time, whereas the amount of methanol $(t_R=0.2$ min) increases with reaction time. This is consistent with reaction (1), four moles of $CH_3OH$ are produced for every hydrolyzed TMOS. The complete hydrolysis of TMOS in an acidic environment was furthr evidenced by thermal gravimetrical analysis and mass spectroscopic analysis. Species evolved from ambient to 600° C. were water and methanol. No organic fragment derived from unreacted TMOS was identified. As part of the process, a concentration step is usually adopted to remove the solvent prior to gelation to reduce the shrinkage. If the hydrolysis is carried out in a basic condition, i.e. pH=8.0, polycondensation/polymerization starts immediately after the initiation of hydrolysis of TMOS as shown in Table I. This would result in a partially hydrolyzed gel which has detrimental effects on later drying and sintering steps. More than 24 hrs are needed for gelation to occur in an acidic environment as compared to less than 5 minutes in an alkali environment (Table V). The rate of gelation or polymerization is controlled by the temperature as well as pH. The gelation rate increases with temperatures as shown in Table VI. Only 45 minutes are required to gel at 75° C., whereas 24 hrs is needed at ambient after TMOS was hydrolyzed at pH 4.4.

The structural transformation from TMOS to gel containing SiOH network was characterized by Fourier Transform Infrared Spectroscopy (FTIR). Dehydration of SiOH ($v_{SiOH}=960^{-1}$) was complete upon firing at 500° C. The FTIR spectra indicate that the structure of the gel sintered at 1100° C. is identical to that of silica.

A fabrication process from $Si(OCH_3)_4$ to moldable transparent solid gel has been formulated. The scheme includes:

1. complete acidic hydrolysis of TMOS at molar ratio of $TMOS/H_2O/CH_3OH=1:8:3$ for 2 hrs to ensure complete hydrolysis;
2. concentration of the sol by 40 v % by vacuum distillation to minimize the shrinkage at sintering step;
3. increasing the pH to 6.5-7.0 by addition of dilute $NH_4OH$ to accelerate the gelation rate;
4. casting into an optical precision mold and allowing the sol to gel.

The schematic for fabrication of $SiO_2$ optical fiber connector is illustrated in FIG. 1.

Molding

After complete hydrolysis of TMOS and polycondensation of $Si(OH)_4$, the sol was cast into a mold with optical precision flatness. The molded sample was gelled and aged to allow the formation of a three dimensional network by further polymerization. After gelation and aging the sample is removed from the mold and, while still immersed in methanol, it is placed in the a Parr pressure reactor for supercritical drying.

Drying

The wet gel consists of a network of $SiO_2$ with about 80 vol % liquid (methanol and water). If this liquid is allowed merely to evaporate into the atmosphere, the capillary forces on the gel would be substantial and the sample would crack. An alternative is to slow the rate of aging by slightly increasing the partial pressure of methanol over the sample and gradually allowing the methanol to escape. Drying by this technique is both slow and hard to control. For large bodies (2" in diameter, ½" thickness) one to two weeks is required. Another alternative is to increase the partial pressure of methanol/$H_2O$ to the point at which the distinction between liquid and vapor vanishes, and then to release pressure slowly, thus avoiding the liquid to vapor transition and the capillary forces. This is the supercritical drying process.

This process usually includes the following steps:

1. The samples are immersed in methanol. The quantity of methanol is that which, when heated with the sample and the methanol therein, produces the required pressure. For example, the pressure reactor (Parr reactor) has a 1 liter capacity and is pressurized to 600 psi Argon prior to heating. The volume of the sample is 65 ml of which 40 ml is liquid. An additional 80 ml of methanol are needed to reach 2400 psi at 280° C. This is well above the supercritical point.
2. Heating the reactor takes about 4 hours, primarily due to the mass of the reactor.
3. The pressure is then slowly released over 3-5 hours and the temperature is maintained at 260-280° C.
4. When the pressure has reached ambient, the reactor is slowly flushed with He and cooled to room temperature. At this point, the gel is porous but strong enough to be handled. It is advisable to keep the gel in a dry atmosphere as it has a surface area of 100-1000 $m^2$/gm (depending on the conditions of hydrolysis and gelation) and will readily absorb moisture.

Reproducibility

Figure 2:
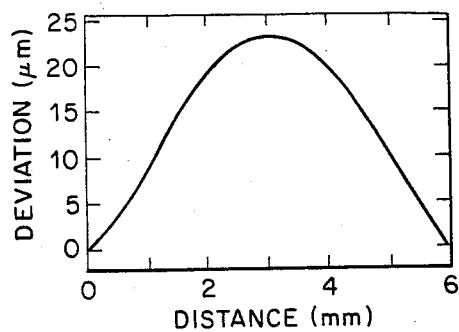
FIG. 2 is a curve of the deviation of the surface of a gel cast onto an optical flat after drying in accordance with the present invention.
Figure 3:
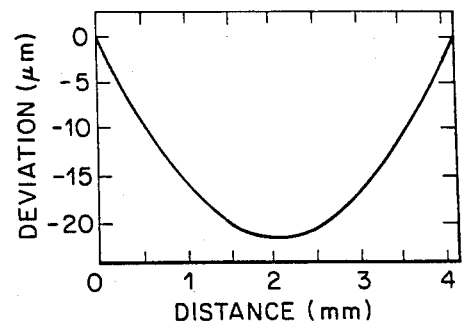
FIG. 3 is a curve of the deviation of the surface of a gel cast onto an optical flat after drying and sintering in accordance with the present invention.

The surface of a dried gel cast onto an optical flat can be measured using a Dektak instrument (Tradename of Sloan Technology Corp.). With this device a stylus traverses the sample and measures the deviation from-flatness. Typical Dektak results for a dried gel and a sintered gel are shown in FIGS. 2 and 3. The surface of the dried gel is convex. The average deviation over the center 3 mm for 32 surfaces is 10.5 microns with a standard deviation sigma, of 2.9 microns. After sintering (which will be discussed below) the surface is concave and the average deviation is 12.0 microns with sigma equal to 3.2 microns. The precision and reproducibility are remarkable good.

Sintering

Figure 4:
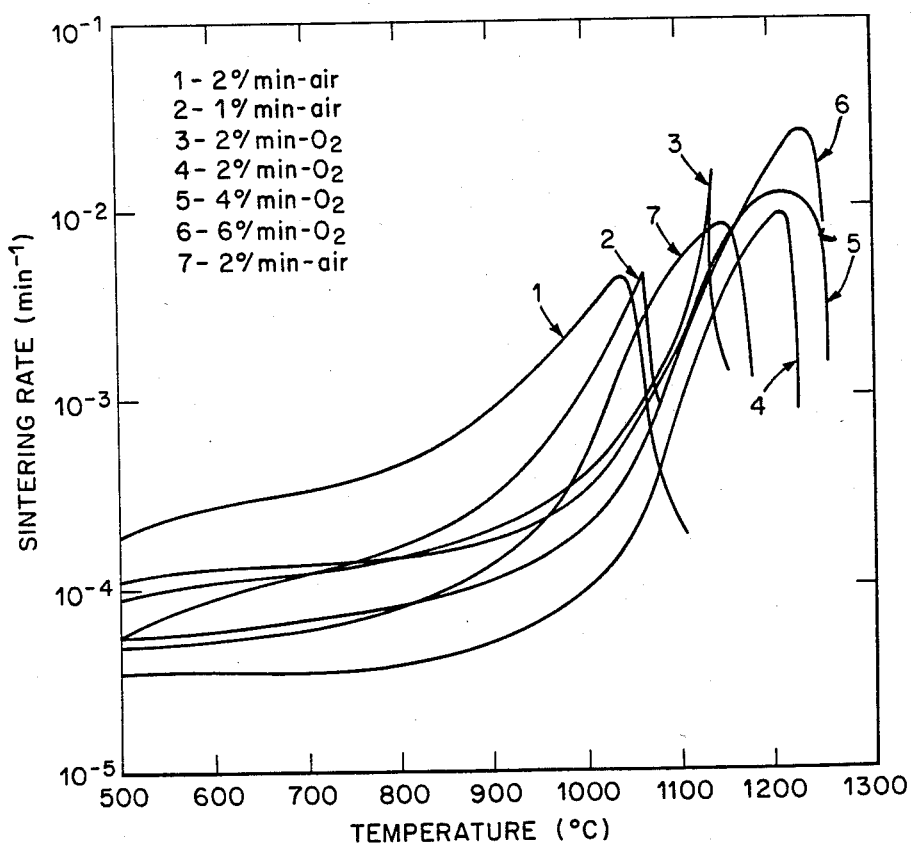
FIG. 4 is a curve of sintering rates of TMOS-derived gels when sintered at constant heating rates of 1° to 6° C./min in $O_2$ and air in accordance with the present invention.

The sintering of a dried gel was studied both isothermally and at a constant heating rate. Dilatometric studies using various heating rates and atmospheres were done to determine the effect of various parameters on sintering behavior. Some of these results are shown in FIG. 4.

The samples which were gelled in an acidic condition were clear as dried (curves 1-3 of FIG. 4) and sintered at a lower temperature than those which were gelled in an alkaline condition which were white or translucent as dried. However, the clear gels bloated immediately after sintering with continued heating. This is due to their much smaller pore size. The surface area of the clear, dried gels is 400-1000 $m^2$/gm. Samples that were white or translucent prior to sintering (curves 4-7 of FIG. 4) were stable against bloating. This is due to the larger pore size (surface area=100-250 $m^2$/gm) which allows water to escape before the pores close. The effect of increasing the heating rate on temperature of maximum sintering rate is small. In $O_2$, the sample is well dried before substantial shrinkage occurs, and the sintering rate increases as the heating rate increases. When the sample is heated in air, less drying has occurred before sintering and the higher water content lowers the viscosity and, therefore, the sintering temperature. During very slow heating in air (1°/min) the sample dries more than when it is heated rapidly, and the sintering temperature increases (curves 1 and 2 of FIG. 4). Some samples were also sintered using a schedule of vacuum during heating from room temperature to 225° C., $O_2$ from 225° C. to 550° C. (where residual organics are burned), and then vacuum from 550° C. to 1250° C. These showed virtually no difference from the samples sintered in $O_2$.

The results of dilatometric studies indicate the complexity of the sintering mechanism, major components, such as structural relaxation, viscous sintering and water evolution, should be considered. Therefore, isothermal sintering measurements were performed. The shrinkage of these samples was determined after isothermal sintering in $O_2$ for various times at temperatures from 1000° to 1200° C. Prior to sintering at 1150° C. and 1200° C., the sample was heated in air at 500° C. for 30 minutes to dry it slightly and avoid cracking and warping. Shrinkage during this preliminary drying is less than 0.5%. Similarly, a dilatometric run in $O_2$ was performed in which there were isothermal holds for 17-20 hours at 510° C., 730° C. and 940° C. These long runs were required to observe the small shrinkage at these low temperatures.

A series of isothermal sintering experiments was done in air. The viscosity determined in air is an order of magnitude less than that in $O_2$ at temperatures greater than 900° C. Below 900° C., they are virtually the same.

The combination of constant heating rate and isothermal sintering experiments has led us to conclude that the optimum sintering conditions consist of preliminary heating at 500° C. for 30 minutes followed by sintering at 1150° C. in $O_2$ for 1½ hours.

Properties of the Dense Glass

The viscosity calculated using a Scherer model is essentially the same as silica. The density of the sintered gel is 2.2 gm/cm$^3$ (measured by the Archimedes technique), greater than 99% of theoretical density, and the average index of refraction is 1.457 (measured with the Abbe refractometer). The infrared spectrum is also the same as fused SiO (1080cm$^{-1}$(S), 800 cm$^{-1}$(W)). Therefore, what we have is a process for forming silica at 1150° C. in a shape reproducible to ±3.2 microns. This is a considerable improvement over the 2000° C. needed to melt silica.

An Example for making an silicate optical glass component comprises the following steps:
1. Hydrolyze a silicon alkoxide, Si(OR)$_4$, such as tetramethyl orthosilicate, Si(OCH$_3$)$_4$, by reacting with an excess amount of water (e.g. the molar ratio Si(OR)$_4$:H$_2$O = 1:8) in a mutual solvent, such as methanol, under acidic conditions, pH = 2-4, at a temperature preferably from 25° to 75° C. but less than 100° C.
2. Remove some of the excess alcohol (20-60% of the original volume) by vacuum distillation to condense the liquid, reduce the final volume shrinkage, and increase the reaction rates in subsequent steps.
3. Add ammonium hydroxide to the above solution in a quantity such that the pH is raised to about 6.5 to about 8.0. After this addition, gelation will occur by the crosslinking of Si-O-Si to form a homogeneous network.
4. Before gelation can take place, casting the liquid into a mold which is designed to compensate for the nonlinear shrinkage which develops during drying and sintering.
5. Curing the gel for a period of 16-48 hours at a temperature of 20-60° C. without drying.
6. Immerse the gelled article from step 6 in a beaker containing methanol.
7. Place the beaker containing the gelled article and methanol in a Parr pressure reactor. Pressurize the reactor with 400-700 psig of N$_2$ or an inert gas such as Ar. Supercritically dry the article at 280° C. and 1200-1800 psi pressure.
8. Maintain the conditions of step 7 for several hours, then within 3 to 5 hours slowly release the pressure. Cool and flush the reactor with an inert gas such as He or Ar to remove trace amounts of solvent from the supercritically dried article.
9. Heat the dried gel to a temperature at which it sinters to a dense glass in 1-3 hours in a dry atmosphere such as He or $O_2$ or a vacuum.

This invention has the advantage that the optical component can be made to very close tolerances without melting the glass. The silicate glass has the advantage that it can be processed at a low temperature and is durable and homogeneous and close dimensional tolerances are achieved during casting and controlled drying resulting in a near net shaped article.

While there has been shown and described what is at present considered the preferred embodiment of the invention, it will be obvious to those skilled in the art that various changes and modifications may be made therein without departing from the scope of the invention as defined by the appended claims.

What is claimed is:
1. A method for making a near net shape silicate optical glass article comprising the following steps:
   Step 1—completely hydrolyzing silicon alkoxide in a solvent at a pH from about 2 to about 4 to form a solution having a molar ratio of silicon alkoxide to water in the range of about 1 to about 10;
   Step 2—partially removing from about 20 to about 60 volume percent of the solvent from the resulting solution of step 1 by vacuum distillation to form a concentrate having a pH of 6.8;
   Step 3—adding sufficient ammonium hydroxide to the concentrate of step 2 to raise the pH of the concentrate from about 6.8 to about 8.0 to accelerate gelation;
   Step 4—transferring the product formed in step 3 into a mold before complete gelation occurs and completing gelation to provide a gel in the mold;
   Step 5—curing the gel formed in the mold from step 4 for a period of about 16 to about 48 hours and at a temperature from about 20° C. to about 60° C., without drying, to form a cured molded article having a solvent remaining therein;
   Step 6—removing the cured molded article having a solvent remaining therein from the mold;
   Step 7—adding a displacing solvent to the product of step 6 to displace the remaining solvent to form a molded article having the remaining solvent displaced;

Step 8—supercritically drying the molded article having the remaining solvent displaced from step 7 to form a dried molded article;

Step 9—flushing the product from step 8 with an inert gas sufficient to remove any trace of the displacing solvent;

Step 10—heating the product from step 9 in a dry oxidizing atmosphere to about 500° C.;

Step 11—sintering the product of step 10 to 1150° C. in oxygen for a period sufficient to form a dense glass article having a dimensional deviation equal to or less than about a 12 microns deviation over a 3 mm center distance on the surface of the dense glass article.

2. A method in accordance with claim 2 wherein said silicon alkoxide in step 1 comprises tetramethyl orthosilicate.

3. A method in accordance with claim 1 wherein said step 1 solvent comprises methanol.

4. A method in accordance with claim 1 wherein said partially removing said solvent comprises removing about 40 v/o of said solvent.

5. A method in accordance with claim 1 wherein said supercritical drying comprises immersing the product from step 4 in methanol contained in a pressure reactor;
   pressurizing to 600 psi in argon;
   heating the reactor to about 280° C. to obtain a pressure of 2400 psi;
   releasing said pressure over a period of about 3 to about 5 hours and maintaining a temperataure at about 260° C. to about 280° C.;
   flushing said reactor slowly with an inert gas when said pressure has reached ambient;
   and continuing said flushing with an inert gas until room temperature has been obtained.

6. A method in accordance with claim 1 wherein said displacing solvent comprises methanol.

7. A method in accordance with claim 1 wherein said inert gas in step 9 is selected from the group consisting of helium, argon and mixtures thereof.

* * * * *